(12) United States Patent
Rothschild

(10) Patent No.: US 6,173,278 B1
(45) Date of Patent: Jan. 9, 2001

(54) METHOD OF AND SPECIAL PURPOSE COMPUTER FOR UTILIZING AN INDEX OF A RELATIONAL DATA BASE TABLE

(75) Inventor: Michael Rothschild, Ramot Hashavim (IL)

(73) Assignee: Newframe Corporation Otd., Or-Yehuda (IL)

(*) Notice: Under 35 U.S.C. 154(b), the term of this patent shall be extended for 0 days.

(21) Appl. No.: 09/352,284

(22) Filed: Jul. 13, 1999

Related U.S. Application Data

(62) Division of application No. 08/963,662, filed on Nov. 3, 1997, now Pat. No. 6,006,219.

(51) Int. Cl.[7] .................................................. G06F 17/30
(52) U.S. Cl. ............................................. 707/3; 707/1
(58) Field of Search ................................ 707/3, 1, 10, 2; 709/200

(56) References Cited

U.S. PATENT DOCUMENTS

| | | | |
|---|---|---|---|
| 5,546,516 | * | 8/1996 | Austel et al. .................. 395/140 |
| 5,560,007 | * | 9/1996 | Thai ............................... 395/600 |
| 5,664,172 | | 9/1997 | Antoshenkov . |
| 5,701,467 | * | 12/1997 | Freeston ......................... 707/100 |
| 5,727,196 | * | 3/1998 | Strauss, Jr. et al. ................ 707/2 |
| 5,727,197 | * | 3/1998 | Burgess et al. ..................... 707/2 |
| 5,745,894 | * | 4/1998 | Burrows et al. ................... 707/5 |
| 5,875,445 | * | 2/1999 | Antonshenkov .................... 707/2 |
| 5,915,251 | * | 6/1999 | Burrows et al. ................. 707/102 |
| 5,926,820 | * | 7/1999 | Agrawal et al. ................ 707/200 |
| 6,029,163 | * | 2/2000 | Ziauddin .......................... 707/2 |

* cited by examiner

Primary Examiner—Wayne Amsbury
Assistant Examiner—Uyen Le
(74) Attorney, Agent, or Firm—Herbert Dubno

(57) ABSTRACT

An index of a relational database or an indexed sequential file is used in a method that does not depend on the implicit or explicit definition of ranges of a key formed as a binary number from concatenation of columns of a Table in the database. As long as not all relevant ranges of the key have been exhausted, the beginning of a next range is found and row identifiers are extracted from entries of the index, where the key belongs to that next range, until that next range is exhausted.

4 Claims, 5 Drawing Sheets

METHOD OF AND SPECIAL PURPOSE COMPUTER FOR UTILIZING AN INDEX OF A RELATIONAL DATA BASE TABLE

CROSS REFERENCE TO RELATED APPLICATION

This application is a division of Ser. No. 08/963,662 filed Nov. 3, 1997, now U.S. Pat. No. 6,006,219.

FIELD OF THE INVENTION

My present invention relates to a method of and to an algorithm for effectively and optimally utilizing an index of a relational data base table and, more particularly, deriving information from a table by accessing locations therein in an improved manner. The invention also relates to a special-purpose computer programmed to carry out the method and in accordance with the algorithm.

BACKGROUND OF THE INVENTION

In relational data bases, it is a common practice to provide an index of a relational data base table in which the index is structured in levels and wherein each row of the table is identified by a respective row identifier (RID). The index can be defined by an ordered list of columns of the table and a concatenation of the list of columns, in a binary number, can serve as a key for the index. The index points to the respective rows of the table by the row identifiers. The index can be used to respond to a query defining a request to access a subset of the rows of the table. Values of some of the columns can be restricted, depending upon the query, to certain ranges and each of the ranges can consist of an ordered list of subranges which have upper and lower bounds.

Such indexes are used in many file systems and data base management systems in order to expedite access to the data contained therein.

Having indexes involves a trade-off, on the one hand, between the effort, disk space and time invested in the maintenance of indexes during update operations and, on the other hand, the effort and time spared when these indexes facilitate in finding relevant data and ignoring irrelevant data.

OBJECTS OF THE INVENTION

It is the principal object of the present invention to provide an improved method for more effectively using existing indexes and which will increase the contribution of the index to the time-sparing accessing of data while reducing the need for additional indexes where increased accessibility to data is desired.

Another object of the invention is to provide a method of utilizing an index of a relational data base which includes an improved method of calculating I/O operations performed.

Yet another object of the invention is to provide a method of utilizing indexes which involves improved selection of the index used.

It is also an object of the invention to provide a special purpose computer programmed to carry out the improved method.

SUMMARY OF THE INVENTION

These objects and others which will become apparent hereinafter are achieved with a method of utilizing such an index in which for as long as all relevant ranges of the key have not been exhausted and without relying upon an implicit or explicit definition of ranges of the key, finding a beginning of a next range, and extracting respective row identifiers from successive entries of the index where the key belongs to the next range until the next range is exhausted.

According to the invention the requested rows of the table are accessed by the steps of:

(a) defining a highest level as a highest relative sequence number in a definition of the index of a column for which the index is to be used and defining oldkey to be a last key created for direct access of the index;

(b) defining a procedure Generate_key as a function of a value parameter and of a level of operation by the steps of:

(b1) in oldkey, replacing a value of the column that appears in the definition of the index in a position designated by the level of operation, by the value parameter, and (b2) in oldkey, replacing the value of all columns appearing in the list defining the index in positions that are greater than the level of operation, by lowest values allowed by their respective ranges;

(c) defining a procedure Generate_next_key as a function of the operation level passed as a parameter by the steps of:

(c1) setting X to be one more than the binary value of the column appearing in the position designated by the operation level in the ordered list of columns;

(c2) if the X is in the range corresponding to the column, returning the result of the activation of Generate_key with X and the operation level as parameters to a caller or requester, (c3) otherwise, if there are any more subranges in the range, setting X to be a beginning of the next subrange of the range and returning the result of Generate_key with X and the operation level as parameters, (c4) otherwise, if the activation level is a lowest level returning to the caller and signaling an end of the index, (c5) otherwise, returning the result of the activation of Generate_next_key with the activation level minus 1 as a parameter, (d) defining a procedure Next_entry as a function of the level in which it is expected to operate, by the steps of:

(d1) if the end of the index has been reached, returning this information to the caller; otherwise until the end of the index is reached or until any subsequent step returns to the caller, repeating the following steps:

(d11) if the level is the highest level, getting the next physical index entry, otherwise carry out Generate_next_key with the level as a parameter in order to generate an access key for direct access of the index and then getting the first index entry with a key greater than or equal to the access key, (d12) checking the key of the index entry just accessed and, if the values of all the columns composing it are in their respective ranges, returning the index entry rust accessed, (d13) otherwise defining a level L to be the lowest level for which the value of the index column disagrees with the range for that column, (d14) if L is not equal to the highest level, activate Next_entry recursively with L as a parameter and return the result; otherwise set K to be the result of the activation of the function Generate_next_key with L as a parameter and access to the first physical index entry with a key that is greater than or equal to K;

(e) until the end of the index is reached, repeatedly using the procedure Next_entry in order to focus on the next relevant index entry; and (f) obtaining the (RIDS) of the relevant rows from the relevant index entries.

The method of the invention is capable of using index prefixes even in cases where some of the columns constituting the prefix have not been referred to by the query. This is accomplished by artificially defining ranges for columns in the column list for which no range can be inferred from the request, as ranges starting with a lowest possible value of the column and ending with a highest possible value.

The methods of the invention as described above can be embedded in a system which also can calculate an estimated number of input/output I/O operations. That system can calculate the I/O operations by the steps of:

(I) defining DB to be a number of blocks in the table, (II) defining DC to be a number of rows in the table, (III) defining K to be a blocking factor of the table (K=DC/DB), (IV) defining M to be a number of RIDs collected and sorted before the data records are accessed, (V) defining Ci to be the cardinality of index column i, (VI) defining Pi to be the selectivity of index column i, (VII) defining R(i) to be the number of ranges for index column i, (VIII) defining IL as the level of the least significant index column for which a nontrivial range is used, (IX) defining DEPTH as the total number of levels in the index, (X) defining Ik as the number of index blocks in index_ level k, (XI) defining IB as the number of blocks in the lowest index_level, (XII) defining $$EF(m,k,n) \equiv 1 - \frac{\Gamma(n-k+1) \times \Gamma(n-m+1)}{\Gamma(n+1) \times \Gamma(n-k-m+1)},$$

(XIII) defining the recursive function CARD as:

m1) CARD(0)≡1, m2) $CARD(i) \equiv CARD(i-1) \times Ci \times EF\left(\frac{DC}{CARD(i-1)}, \frac{DC}{Ci}, DC\right),$ (XIV) defining the recursive function PROD as:

n1) PROD(0)≡1, n2) $PROD(i) \equiv PROD(i-1) \times Ci \times Pi \times EF\left(\frac{DC}{CARD(i-1)}, \frac{DC}{Ci}, DC\right).$ (XV) defining f(m)=DB×EF(m,K,DC), (XVI) defining $$ND \equiv \left\lfloor \frac{DC \prod_{i=1}^{u} Pi}{M} \right\rfloor \times f(M) + f\left(\left(DC \cdot \prod_{i=1}^{IL} Pi\right) \% M\right),$$

(XVII) defining $$IOH \equiv \sum_{i=0}^{IL-1} PROD(i) \times R(i+1),$$

(XVIII) defining $$PH \equiv \sum_{k=1}^{DEPTH} Ik \times EF\left(IOH, \frac{DC}{Ik}, DC\right),$$

(XIX) defining $$PL \equiv IB \times \prod_{i=1}^{IL} Pi, \text{ and}$$

(XX) then estimating the number of I/O operations as PH+PL+ND.

That system, moreover, can be provided with a method for selection of an optimal combination of one index in a set of indexes and a sequence number of one column in the definition of the one index. That selection can be effected by the steps of:

α) for all index columns compared to a constant,

α1) creating the appropriate range description,

β) setting the number of I/O operations required for sequential access of the table as the current optimum and sequential access as the currently optimal access plan;

γ) for all the indexes of the table:

γ1) for all columns in current index:

γ11) using the method described at I to XX to estimate the number of I/O operations needed for the execution of the index scanning procedure previously described, when all the columns in the index, up to this column, are used, and γ12) If the result is smaller than the minimum up to this moment, remembering the result, the index and the current column as the currently optimal combination.

Estimates for the number of I/O operations can be further improved by the steps of:

for each column in the definition of the index, creating a distribution table containing the N most frequent values and their relative frequency in the table, N being some predetermined number, and for each level in the index, maintaining the number of blocks in that level.

When the methods are applied to general index sequential files, the system can include the steps of:

creating meta data describing the various fields in the files, collecting statistics for all fields that are part of indexes of the file, and detecting all the possible descriptions of the indexes as concatenations of some of the fields.

The description of meta data can be extracted from an existing description in a program written in a programming language, the detection of all possible descriptions of indexes being performed automatically, e.g. by a computer programmed to carry out the algorithms.

It will be appreciated that all modern relational data base management systems support the definition, maintenance and use of indexes. Most of these also support structured query language (SQL) as a data manipulation language. SQL and other nonprocedural data manipulation languages concentrate on a definition of what the system is requested to do rather than how it is requested to do it and, as a result, considerable effort has been invested to automatically create efficient access plans that minimize the number of input/output operations required for completion of a request. Most relational data base management systems collect statistics that roughly describe the values in the different components of their indexes. These statistics can then serve for calculation of a preferred access plan.

As far as I am aware, existing techniques for using indexes and building access plans utilize algorithms that extract from a query definition a set of ranges in some of the available indexes and access the index entries in these ranges. The data rows pointed to by some of these entries can likewise be accessed.

The major difference between the present invention and these earlier systems is that the present invention provides a way of automatically generating multiple ranges in cases in which other methods would only detect the possibility of using a single range containing these automatically generated multiple ranges along with the many other nonrelevant ranges. Of course the methods or algorithms of this description can be embodied in a computer and are automatically affected by a computer programmed to carry out the algorithm and thus the invention includes a special purpose computer so programmed.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
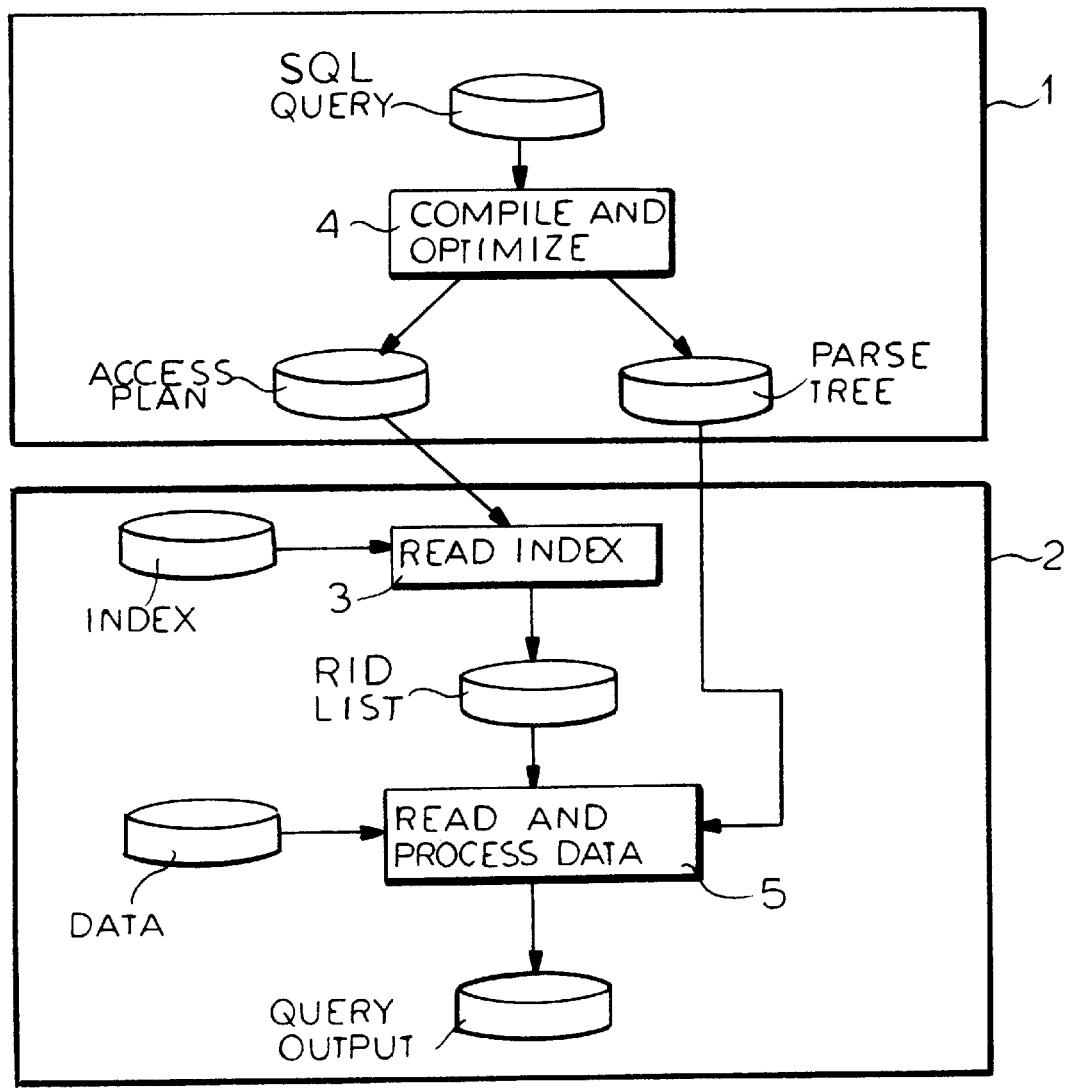
FIG. 1 is an information flow diagram illustrating the general flow of an SQL retrieval query through a data base management system (DBMS)

FIG. 1 describes the general flow of an SQL retrieval query through a DBMS. Although this invention is not restricted to relational data bases, most of its implementations will probably be in this context. The Figure is a conceptual one and does not necessarily represent any existing system; different elements represented in this Figure could be united into a single file and take a different form. For example, the parse tree and the access plan could be united in a single file that contains a fully compiled program rather than instructions for the execution mechanism.

The upper rectangle 1 describes what a possible implementation of an SQL query processor could do in compile time.

Such an implementation would perform the tasks described in the lower rectangle 2 in execution time.

The algorithms described in FIGS. 2–5 relate to the program "read index" 3. The "read index" program results in a list of record identifiers RIDs that can then be used in order to access the data records. Generally, in cases where the order of the RIDs is related to the order of the disk addresses of the data records, this list should be ordered before the data is accessed, in order to reduce the number of physical blocks that are actually read.

The algorithms described in Table II (below) relates to the "compile and optimize" program 4. It should be noted that the program "Read and process data" could be omitted when all the data that is needed can be found in the index. In this case, the "read index" program 3 would process the data of the relevant index records and not create a list of their RIDs.

Figure 2:
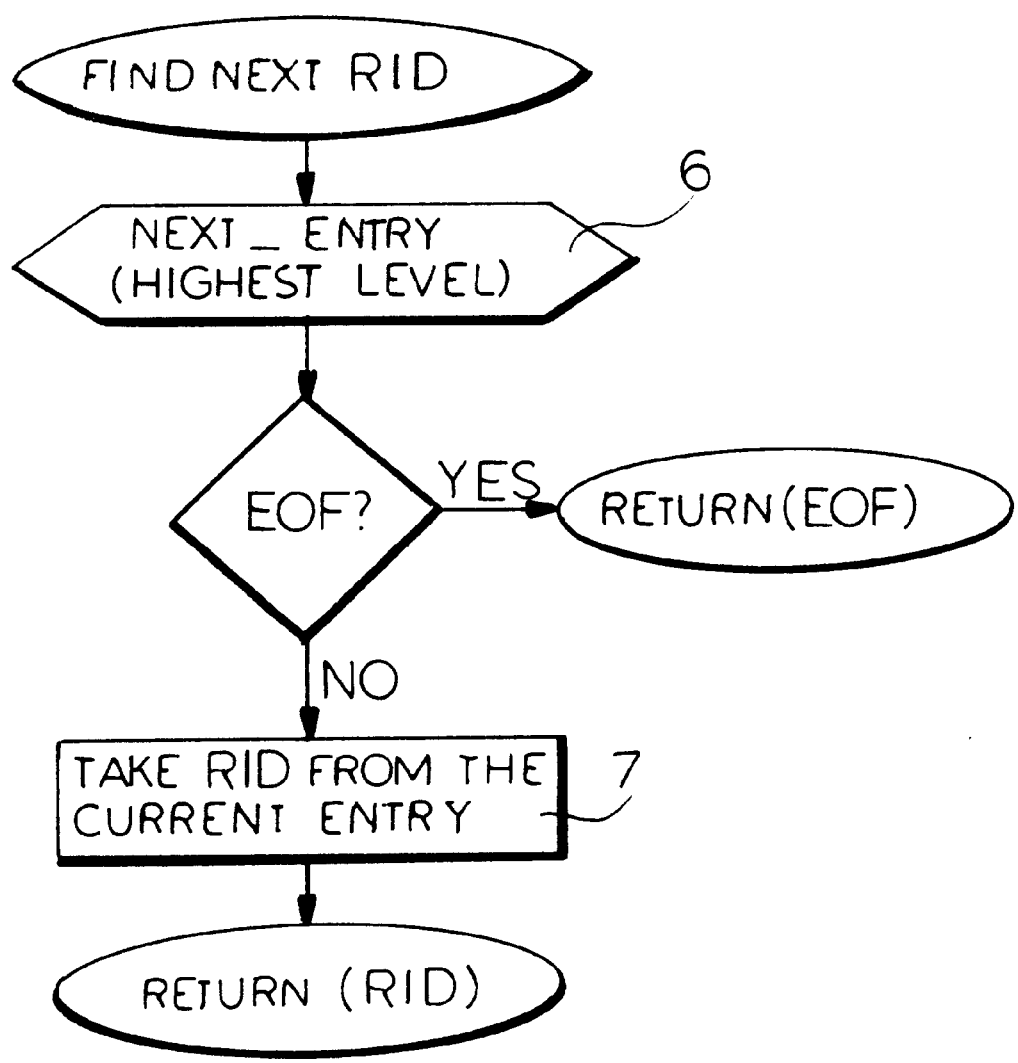
FIG. 2 is a diagrammatic representation of the algorithm for selecting relevant RIDs.

FIG. 2 describes the uppermost level of the RID retrieval procedure, the function "find-next-RID".

The function is repeatedly invoked, at execution time, in order to retrieve the RIDs of the relevant rows.

Most of the work needed for this task is performed by the function "Next-entry" 6 invoked every time "Find-next-RID" is activated; the parameter supplied to "Next-entry" by "Find-next-RID" is always the sequence number in the index of the least significant column which is designated by the highest level.

In cases where index only retrieval has been decided upon, an equivalent procedure could be used, that replaces the action "Take RID from the current entry" by the action "Take all the requested data from the current entry".

Figure 3:
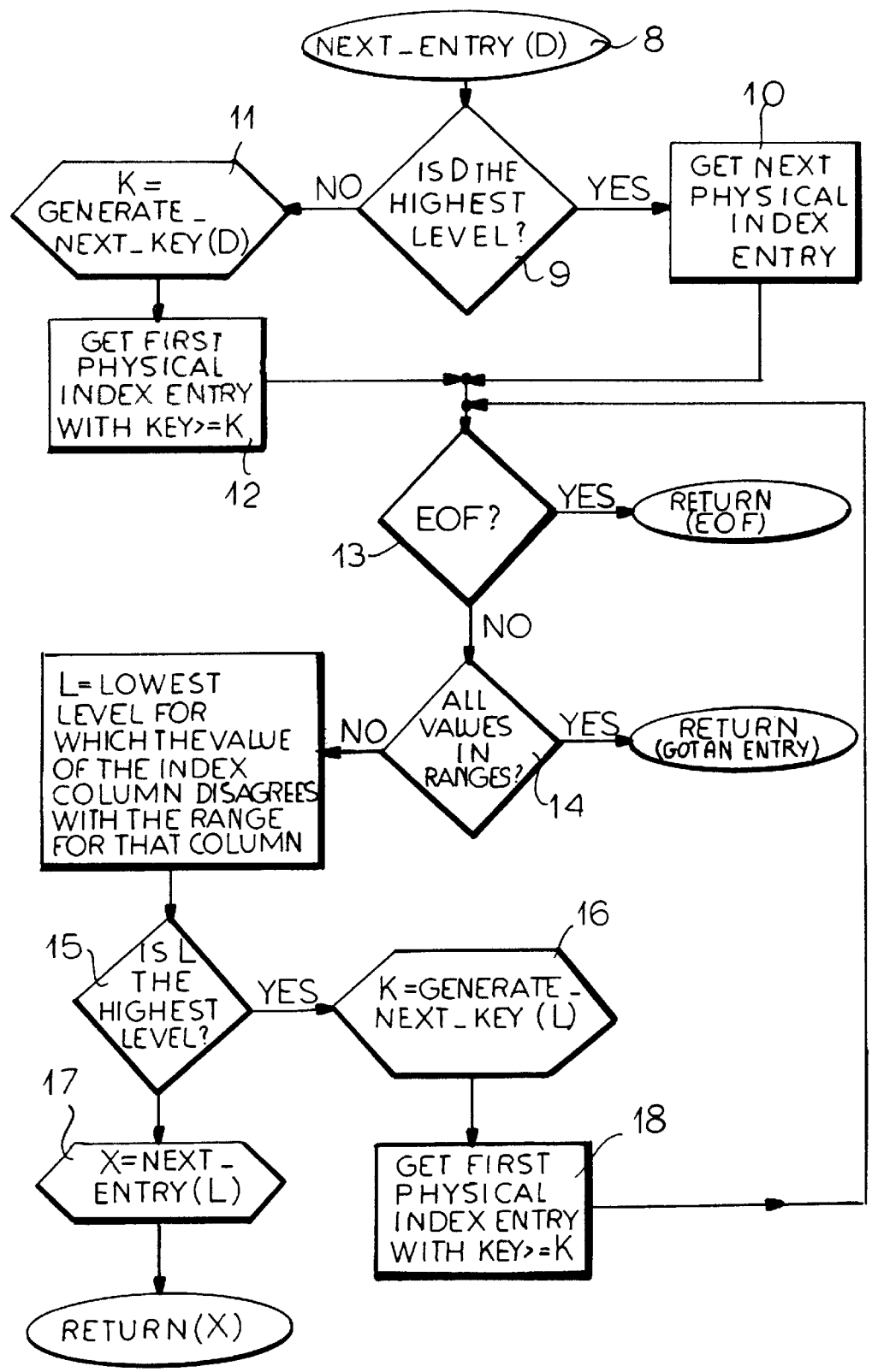
FIG. 3 is a diagram of the algorithm used for reading relevant index records.

FIG. 3 describes the "Next-entry" function 8 invoked with a depth parameter—"D" designating the sequence number in the index of the column that should be advanced. In the terminology of this invention, columns in the index are sequenced from the most significant index column to the least significant one, the most significant receiving the sequence number 1 and the least significant receiving the highest sequence number. When not otherwise indicated, the term "level" is used with the same meaning as "sequence number".

The first decision 9 in this flow chart is whether the input level is the highest (least significant) one. This decision is made since the behavior in this case is different than in all other cases. In the case of the least significant level, the index records are normally read sequentially, as seen in action rectangle 10; only when sequential read exits a range is a direct access to the index needed; this situation is handled in action rectangle 18.

If D is not the level of the least significant column, the function Generate_next_key is invoked in 11 since change of value in this level will most probably enable us to discard many keys. Generate_next_key returns the next index key worth checking and a direct index read, with this key is performed in 12.

At this stage, both branches from the decision 9 have resulted in an I/O operation and a check for end of file is performed in 13.

If the end of file has been reached, the current retrieval operation has been concluded. If, on the other hand, an index entry has been read, its validity is checked through a comparison of each column in this entry, to the value ranges allowed for this column.

This is done at decision square 14.

If the key is valid, the index entry just read becomes the current one and a return code of "Got an entry" is sent to the caller.

Otherwise, the lowest level (most significant) column whose value in the key of the index entry just read is outside the valid ranges is detected and its sequence number is assigned to L. Then a check is made (in 15) whether L is the highest (least significant) level used in the current request.

If L is the highest level it means that the key exited the range of the least significant column and a sequential read in this level is no longer a solution. In order to generate the next key for direct access, Generate_next_key is invoked in 16. Then a direct index read is performed in 18 and the flow returns to 13 for the check of an end of file situation.

If L is not the highest level, the function "Next-entry" calls itself recursively at 17, supplying the offending level L, as a parameter.

The result of this call is returned to the caller.

Figure 4:
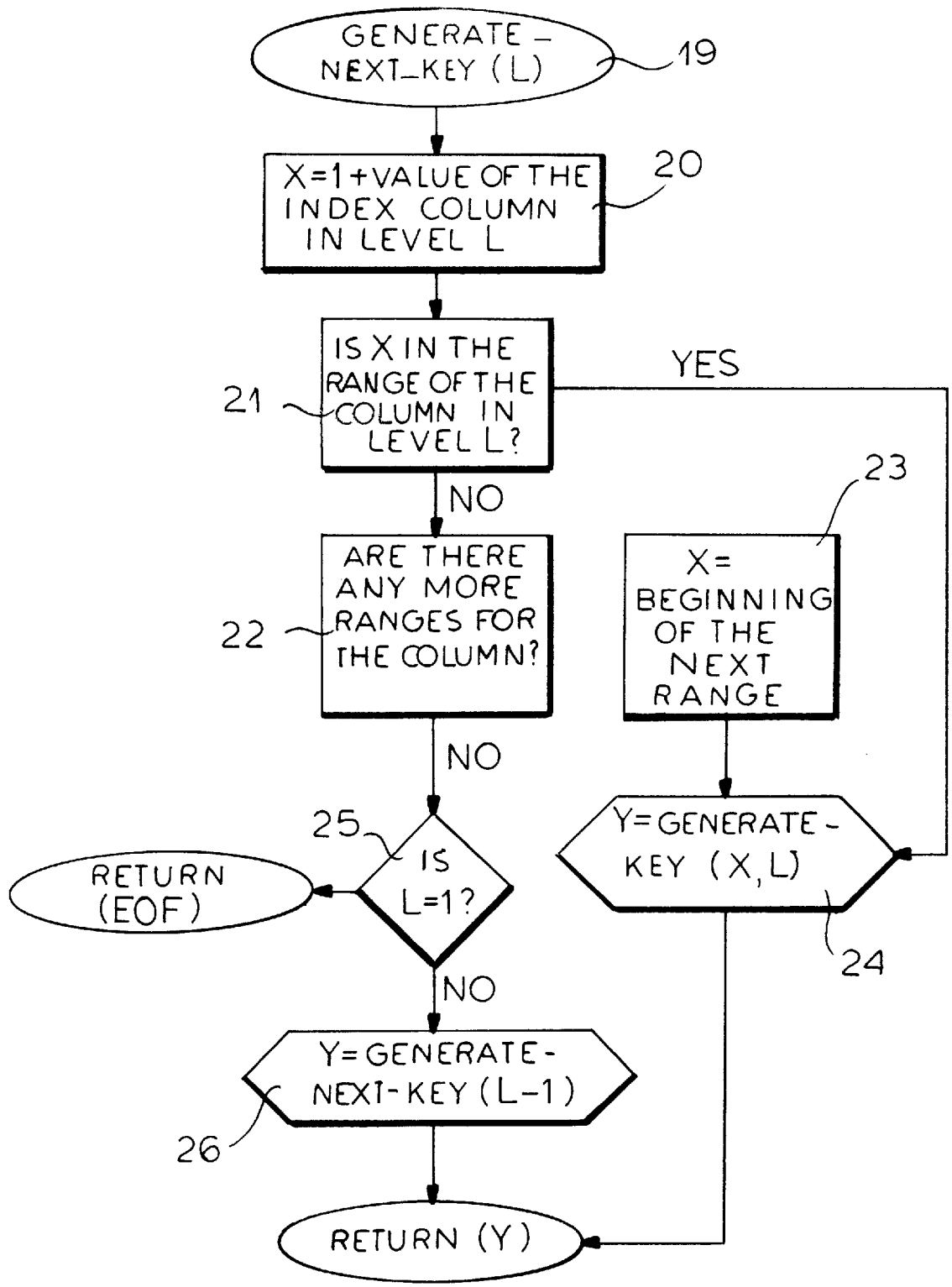
FIG. 4 is a diagram of the algorithm used in generating keys for index-direct access.

FIG. 4 depicts the process of generation of keys for direct index reads.

This task is performed by the function Generate_next_key that receives the depth of the most significant column that has to change as the parameter L 19.

Figure 5:
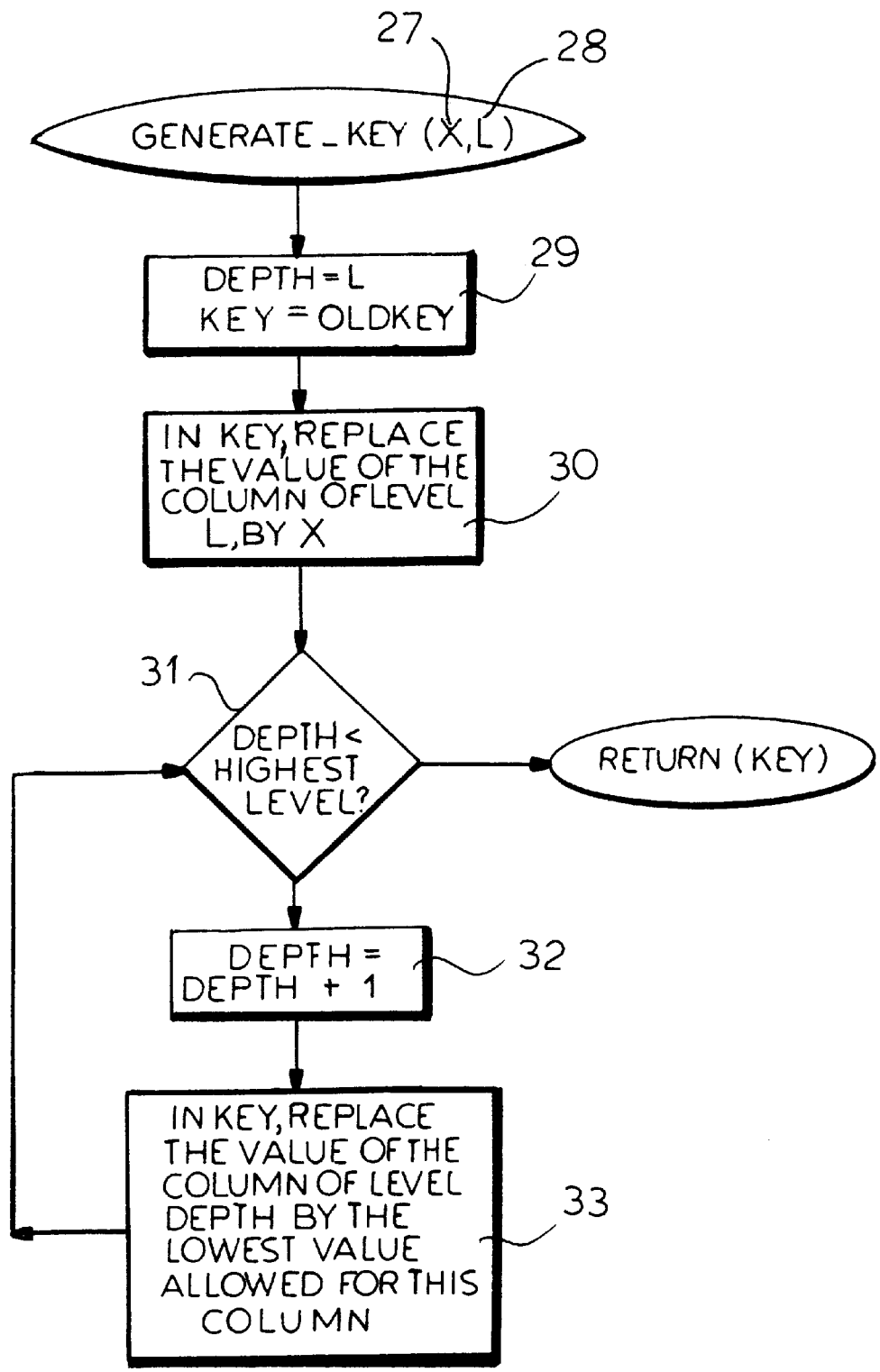
FIG. 5 is a diagram of the algorithm for creating a key.

This function first selects the next value for the column whose depth was supplied in L 19 and then 23 uses the function Generate_key depicted in FIG. 5 to complete the index key.

In order to generate the next value of the column described by L, Generate_next_key first adds 1 to the current value of this column 20, this addition will usually be an unsigned binary addition since this is the order normally implemented by the index but the same algorithm would apply with a different addition in cases where the order of the index is implemented in a different way. The result of this addition is stored in X which is now checked 21 for conformance with the current range for the relevant column.

If the value of X is within that range, then the new complete key is created in Y by the function Generate_key 24 and the result is returned to the caller.

Otherwise the value of X is not within the current range for the column level L; a check is made 22 as to whether additional ranges are available for this column.

If additional ranges are available, the beginning of the next range is taken as the next value of X 23 and Generate_key is used 24, as before, to create the complete key to be returned.

If there are no additional ranges for the column, a check is made if the column in question is the most significant one 25. If it is, the scan has terminated and no more keys can be generated; we return EOF. Otherwise, we climb down one level and generate the next key from level L-1 26.

FIG. 5 depicts the process of generating index keys at the beginning of a range whose most significant column values are to remain as they are, the value of the column whose level is supplied in the second parameter—L 28 is to become X—the value of the first parameter 27, and the values of the columns which are of level higher (less significant) than L are each to become the beginning of the first range for these columns.

In 29 the Key variable is initialized to the value of the current direct access key. The Depth variable is initialized as L, the level of the column where the change of the key begins.

In 30 the value of the column in level L (in the index key we are currently building), is replaced by X.

After the column of level L has been updated, a loop is started that updates all columns in the index key that are less significant than this column (have a level that is higher than L).

This loop is started by checking 31 whether all the columns in the key have already been handled. If they have, we return the key we created.

If not all columns have been handled, the Depth variable is updated 32 to point to the next column in the index and then the value of this column is replaced 33 in the key by the value defining the beginning of the first range defined for this column.

Then we return to the beginning of the loop and check again 31 if the process has terminated.

Note that the algorithm described in FIGS. 1–5 may be implemented in order to scan the index in reverse order. The only changes needed in order to support reverse order reading are:

in the physical read (FIG. 3, action rectangle 10), where the previous entry should be accessed,
 in the generation of the beginning (or, more accurately, the end) of the new range (FIG. 4, action rectangle 20), where a binary one is subtracted and not added,
 in FIG. 4, action 23, X should be assigned the "End of the previous range" and not the "Beginning of the next range".

"<=" replaces ">=" in FIG. 3, action rectangles 12 and 18.

TABLE I contains a schematic C representation of the main data structures required for the implementation of the method.

TABLE I

---

RANGE_BOUND

Describes a bound (upper or lower) of a *column_value_element*.
typedef struct range_bound{(
        CONSTANT_DESCRIPTION *value;
        char type;[1]
        }RANGE_BOUND;
RANGE Describes a single range of values of a single column.
    typedef struct range{
        struct range *next; /*NULL for first*/
        struct range *prev; /*NULL for last*/
        float price;
        RANGE_BOUND lower_bound;
        RANGE_BOUND upper_bound;
        }RANGE;
COLUMN_VALUES An ordered list of *column_value_elements* that describes all the interesting values of a single column.
    typedef struct col_val {
        struct col_val prev; /*NULL for first*/
        struct col_val next; /*NULL for last*/
        COLUMN_ID COLUMN_id;
        int nunber_of _ranges;
        float price;/*total of all elements*/
        RANGE *last;
        } COLUMN_VALUES;
INDEX STRUCTURE describes all the column values that are relevant for a single index request.
    typedef struct index {
        COLUMN_VALUES *first;
        }INDEX;

---

[1]"(" means that the lower bound is not included in the range, "{ means that it is, "X" means that the range is abound of a single valued range, "*" means that the lower bound is minus infinity. The case off upper bound is symmetrical.

In TABLE I the RANGE_BOUND structure describes a single bound (lower or upper) of a single range of a single column. The type field is there to signal if this range is open or closed on this side (< or <= respectively, for the upper bound) it may also be used to signal some interesting situations like "unbound" bounds (reaching to infinity), or bounds corresponding to NULL values. The value field points to a value for that column that limits the range.

The RANGE structure describes a single range (lower and upper bounds of a single column.

RANGE structures are chained in higher level structures (through the previous and next fields) in order to describe the complete set of restrictions for that column. The price field is there for the purpose of optimization calculations that may take place during the index selection process. It should be noted that a range could also be unbound in both sides; the type field in the bounds may also be used in this case, to signal whether NULL values are to be included or not. This feature is important since there are cases where an index prefix should be used although some of the columns in it have not been referred to at all, by the query.

The COLUMN_VALUES structure represent the whole set of restrictions imposed on a single column in a single index access definition. It is an ordered chain of distinct ranges of values this column is allowed to have when satisfying this request. This structure also contains a price field for optimization purposes. COLUMN_VALUES structures are chained (through the previous and next fields) to define a complete index access request.

The INDEX structure points to a list of COLUMN_VALUES structure, defining together the restrictions for all the columns relevant for this request. This is the structure used by the Next-entry function to determine the validity of keys and to create the beginning (or end) of key ranges.

TABLE II is a high level description of the index selection process that is implemented as part of the creation of access plans.

TABLE II

For all index columns compared to a constant LOOP_1 create the appropriate COLUMN VALUES structure

End LOOP 1;

Set the number of I/O operations required for sequential access as the current optimum and sequential access as the currently optimal access plan.

For all indexes of the table to be accessed LOOP_2

For all columns in the index LOOP_3

Estimate the number of I/O operations needed for the execution of the general index scanning procedure when all the columns in the index, up to this column, are used (do it as described in TABLE III);

If the result is smaller than the minimum up to this moment, remember the result, the index and the current column as the currently optimal combination;

End LOOP_3;

End LOOP_2;

When this process terminates, the index that is to be used, has been selected along with the depth (in terms of the columns from the beginning of the list of columns composing the index) of this index. The creation of the actual request (in terms of an INDEX STRUCTURE) may then start (it may also be implemented as part of the index selection process).

TABLE III describes the calculations performed for the estimation of the number of I/O operations.

TABLE III

Estimating the number of I/O operations needed to perform a given index request.

Define DB to be the number of blocks in a table.
Define DC to be the number of rows in a table.

TABLE III-continued

Estimating the number of I/O operations needed to perform a given index request.

Define K to be the blocking factor of the table $K \equiv \frac{DC}{DB}$

Define M to be the number of RIDs collected and sorted before the data records are accessed.
Define CI to be the cardinality of index column i.
Define Pi to be the selectivity of index column i.
Define R(i) to be the number of ranges for index column i.
Define IL as the level of the least significant index column for which a non trivial range is used.
Define DEPTH as the total number of index levels in the index.
Define Ik as the number of index blocks in index_level k.
Define IB as the number of blocks in the lowest index_level.

$$\text{Define EF}(m, k, n) \equiv 1 - \frac{\Gamma(n-k+1) \times \Gamma(n-m+1)}{\Gamma(n+1) \times \Gamma(n-k-m+1)}$$

$$\text{CARD}(i) \equiv \text{CARD}(i-1) \times Ci \times EF\left(\frac{DC}{\text{CARD } t-1}, \frac{DC}{Ci}, DC\right)$$

$$\text{PROD}(i) \equiv \text{PROD}(i-1) \times Ci \times Pi \times EF\left(\frac{DC}{\text{CARD} t-1}, \frac{DC}{Ci}, DC\right)$$

$$\text{Define ND} \equiv \left[\frac{DC \cdot \prod_{p=1}^{IL} Pi}{M}\right] \times f(M) + f\left(\left(DC \cdot \prod_{p=1}^{IL} Pi\right) \% M\right)$$

$$\text{Define IOH} \equiv \sum_{i=0}^{IL-1} \text{PROD}(i) \times R(i+1)$$

$$\text{Define PH} \equiv \sum_{k=1}^{DEPTH} Ik \times EF\left(IOH, \frac{DC}{Ik}, DC\right)$$

$$\text{Define PL} \equiv IB \times \prod_{i=1}^{IL} Pi$$

Then the estimate for the number of I/O operations will be PH + PL + ND

Then the estimate for the number of I/O operations will be PH+PL+ND.

In TABLE III these calculations handle all columns in a symmetrical way, taking their depth in the index definition into account but making no special case for any depth; this is why the statistics that these calculations can use for every column are more extensive than any existing DBMSs currently collects (for example, distribution tables containing the percentage for the ten most frequent values may be used for every column; such tables are currently created by DB2 only for columns that appear first in the definition of an index; other DBMS do not create them at all).

The selectivity of a column in an index request is the price appearing in the COLUMN_VALUES structure describing it. It stands for the probability for a given row in the table to have a value for this column, that is valid for that request. It may be calculated in various ways (depending upon the statistics available), one of these ways is described in TABLE IV.

The term index-level does not stand for the level of a column in an index, but for a physical level in the index (which, as is well known in the art, is implemented as a set of blocks, each belonging to one index_level and pointing to blocks in the next index_level).

The value M has been defined in order to support an algorithm that repeatedly collects up to M RIDs and then sorts them before accessing the rows they point to, in order to minimize the number of I/O operations actually causing access to secondary storage; the assumption behind this algorithm is that the order of the RIDs represents the physical order of the locations of the rows on the secondary storage device.

The term trivial range, mentioned in the description of IL is meant to describe an unlimited range containing all the possible values of the column (including NULL values).

Normally Ik does not have to be counted but can be computed from the structure of the index. For example, in a typical situation we could expect the relation $Ik=[I(k+1)/KIB]$ where KIB is the number of keys in an index block, to hold, permitting one to calculate Ik, once one knows the number of blocks in the deepest level.

It is easy to see that $$PROD(k) = CARD(k) \times \prod_{i=1}^{k} Pi$$

and it may also be defined this way.

The formula for PH assumes that there is a thread associated with every index level, enabling the read process, to read every index block (of every index_level) only once, during a process that advances on the index in one direction. If no such thread is dedicated for every index level, the formula could be changed to $$PH=DEPTH \times IOH$$

The function EF can be efficiently calculated using the gammln function described in the book "Numerical Recipies in C" (William H. Press, Saul A. Tevkolsky, William T. Vetterling, Brian P. Flannery, NUMERICAL RECIPES IN C.—The Art of Scientific Computers, Second Edition, 1992, Cambridge University Press at page 214), to calculate the log of gamma.

When no data access is required (in index only retrieval) the formula for the total I/O will change to PH+PL.

TABLE IV describes the calculation of the selectivity of a single range for a given column. The entire selectivity for that column may then be calculated as the sum of the individual selectivities of the ranges that are eligible for it (appear in its COLUMN_VALUES structure).

TABLE IV

Calculating the selectivity of a range of values for a given column.
For every column that is the first in an index, DB2 maintains a table containing the 10 most frequent values and their frequency.
Our method uses this data whenever available (It would also use it for columns that are not the first column of any index, were it available in these cases)
It uses the following algorithm:
card_in = number of values appearing in the distribution table that are contained in the range;
card_out = number of values appearing in the distribution table that are not contained n the range;
card_dist = card_in + card_out;
card_not_dist = column_cardinality − card_dist;
freq_in = sum of all the frequencies of values in the distribution table, contained in the range;

TABLE IV-continued freq_out = sum of all the frequencies of values in the distribution table, not contained in the range;
freq_dist = freq_in + freq_out;
average_of_others = (1 − freq_dist)/card_not_dist;
ratio = (range_high_bound-range_low_bound)/ (column_high_bound − column_low_bound);
range_selectivity = freq_in + max(0, (column_cardinality*ratio-card_in))*average_of_others;

Many statistics about the distribution of the data in the database are used in the calculations; these statistics are supposed to be available through a statistics gathering procedure that the database administrator (DBA) should run from time to time, preventing the data and the statistics from considerably "drifting apart."

The calculations described in TABLES III and IV can, of course, be easily augmented to cover issues like clustering ratio, missing statistics, different prices for direct access than for sequential access etc. but these are not the essence of this invention.

Some DBMSs may collect statistics for interesting combinations (usually prefixes) of columns in an index and not only the statistics of single columns; when such statistics are available, the combination may be viewed as a single column when estimating the cost of using the index containing it.

Also, there are many possible implementations of the algorithm described in TABLES II–IV. For example, the calculation of PROD and CARD will most probably be combined in order to increase the efficiency of the calculation of both functions and both functions, as well as the calculation of IOH could be embedded in the loop LOOP_3 described in TABLE II in such a way that the results obtained in one iteration of this loop will serve to shorten the calculation in the next iteration. All these local changes do not create a different algorithm.

Typically, DBMSs choose an access plan using a variety of methods; the method described is intended to be used as one of the alternatives that the system considers and not necessarily the only one. Any combination of this method or parts of it, with other methods is intended to be within the scope of the appended claims.

What is claimed is:

1. A method for utilizing an index of a relational database table in which the index is structured in levels and wherein each row of said table is identified by a respective row identifier (RID) and said index is defined by an ordered list of columns of said table, a concatenation of said list of columns of said table serving as a key for said index in terms of a binary number, said index pointing to respective rows by the row identifiers, in response to a query defining a request to access a subset of the rows of said table, wherein values of some of said columns are restricted to ranges of values of said some of said columns and each of said ranges consists of an ordered list of subranges and each of said subranges is defined by an upper and a lower bound, said method comprising the steps of:

calculating a beginning of a first range of values of said key, based on said ranges of values of said some of said columns as a minimal binary number in which all values corresponding to columns in said ordered list of said columns are within their respective ranges;

extracting row identifiers from successive entries of said index for said first range of values of said key until a key in which at least one of the values corresponding to columns in said ordered list of said columns is not within its respective range is encountered;

for as long as relevant ranges of values of said key have not been exhausted and without relying upon an explicit or implicit definition of ranges of values of said key, calculating a beginning of a next range of values of said key, based on said ranges of values of said some of said columns and said key in which at least one of the values corresponding to columns in said ordered list of said columns is not within its respective range as a minimal binary number in which all values corresponding to columns in said ordered list of said columns are within their respective ranges and which is larger than said key in which at least one of the values corresponding to columns in said ordered list of said columns is not within its respective range and extracting row identifiers from successive entries of said index for said next range of values of said key until a key in which at least one of the values corresponding to columns in said ordered list of said columns is not within its respective range is encountered.

2. The method defined in claim 1 which is embedded in a system including calculation of an estimated number of I/O operations by the steps of:

(I) defining DB to be a number of blocks in said table, (II) defining DC to be a number of rows in said table, (III) defining K to be a blocking factor of said table (K=DC/DB), (IV) defining M to be a number of RIDs collected and sorted before the data records are accessed, (V) defining Ci to be the cardinality of index column i, (VI) defining Pi to be the selectivity of index column i, (VII) defining R(i) to be the number of ranges for index column i, (VIII) defining IL as the level of the least significant index column for which a nontrivial range is used, (IX) defining DEPTH as the total number of levels in the index, (x) defining Ik as the number of index blocks in index_level k, (XI) defining IB as the number of blocks in the lowest index_level (XII) defining $$EF(m, k, n) \equiv 1 - \frac{\Gamma(n-k+1) \times \Gamma(n-m+1)}{\Gamma(n+1) \times \Gamma(n-k-m+1)},$$

(XIII) defining the recursive function CARD as:

m1) CARD(0)=1, $$m2) \; CARD(i) \equiv CARD(i-1) \times Ci \times EF\left(\frac{DC}{CARD(i-1)}, \frac{DC}{Ci}, DC\right),$$

(XIV) defining the recursive function PROD as:

n1) PROD(0)=1, $$n2) \; PROD(i) \equiv PROD(i-1) \times Ci \times Pi \times EF\left(\frac{DC}{CARD(i-1)}, \frac{DC}{Ci}, DC\right),$$

(XV) defining f(m)=DB×EF(m,K,DC), (XVI) defining $$ND \equiv \left\lfloor \frac{DC \cdot \prod_{i=1}^{u} Pi}{M} \right\rfloor \times f(M) + f\left(\left(DC \cdot \prod_{i=1}^{IL} Pi\right) \% M\right),$$

(XVII) defining $$IOH \equiv \prod_{i=0}^{IL-1} PROD(i) \times R(i+1),$$

(XVIII) defining $$PH \equiv \prod_{k=1}^{DEPTH} Ik \times EF\left(IOH, \frac{DC}{Ik}, DC\right),$$

(XIX) defining $$PL \equiv IB \times \prod_{i=1}^{IL} Pi, \quad \text{and}$$

(XX) then estimating the number of I/O operations as PH+PL+ND.

3. The method defined in claim 2 wherein said system is provided with a method for selection of a combination of one index in a set of said indexes and a sequence number of one column in the definition of said one index which comprises the steps of:

α) for all index columns compared to a constant,
  α1) creating the appropriate range description,
β) setting the number of I/O operations required for sequential access of said table as the current optimum and sequential access as the currently optimal access plan;
γ) for all said indexes of said table:
  γ1) for all columns in current index:
    γ11) estimating the number of I/O operations needed for the execution of the index scanning procedure by steps I through XX, when all the columns in the index, up to this column, are used,
    γ12) if the result is smaller than the minimum up to this moment, remember the result, the index and the current column as the currently optimal combination.

4. A method for utilizing an index of a table in which the index is structured in levels and wherein each row of said table is identified by a respective row identifier (RID) and said index is defined by an ordered list of columns of said table, a concatenation of said list of columns of said table serving as a key for said index in terms of a binary number, said index pointing to respective rows by the row identifiers, in response to a query defining a request to access a subset of the rows of said table, wherein values of some of said columns are restricted to ranges of values of said some of said columns and each of said ranges consists of an ordered list of subranges and each of said subranges is defined by an upper and a lower bound, said method comprising the steps of:

calculating a beginning of a first range of values of said key, as a minimal binary number in which all values corresponding to columns in said ordered list of said columns are within their respective ranges;

extracting row identifiers from successive entries for said index of said first range of values of said key until a key in which at least one of the values corresponding to columns in said ordered list of said columns is not within its respective range is encountered;

for as long as relevant ranges of values of said key have not been exhausted calculating a beginning of a next range of values of said key, as a minimal binary number in which all values corresponding to columns in said ordered list of said columns are within their respective ranges and which is larger than said key in which at least one of the values corresponding to columns in said ordered list of said columns is not within its respective range; and extracting row identifiers from successive entries of said index for said next range of values of said key until a key in which at least one of the values corresponding to columns in said ordered list of said columns is not within its respective range is encountered.

* * * * *